US012771747B2

(12) United States Patent
Kazi

(10) Patent No.: US 12,771,747 B2
(45) Date of Patent: Oct. 20, 2026

(54) UTILIZING IoT DEVICE INFORMATION TO DYNAMICALLY DETERMINE WHETHER TO RESTRICT AN IOT DEVICE FROM ACCESSING ONE OR MORE IOT NETWORKS

(71) Applicant: T-MOBILE INNOVATIONS LLC, Overland Park, KS (US)

(72) Inventor: Ariful Islam Kazi, Renton, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 94 days.

(21) Appl. No.: 18/882,414

(22) Filed: Sep. 11, 2024

(65) Prior Publication Data

US 2026/0075109 A1 Mar. 12, 2026

(51) Int. Cl.
*H04L 67/12* (2022.01)
*H04L 41/0816* (2022.01)

(52) U.S. Cl.
CPC .......... *H04L 67/12* (2013.01); *H04L 41/0816* (2013.01)

(58) Field of Classification Search
CPC . H04L 41/0806; H04L 41/0816; H04L 63/08; H04L 63/0823; H04L 63/0876; H04L 63/101; H04L 63/102; H04L 63/1425; H04L 63/20; H04L 67/12; H04L 67/125; H04L 67/141; H04L 67/34; H04W 12/04; H04W 12/06; H04W 12/069; H04W 12/08; H04W 12/50; H04W 4/50; H04W 4/70; H04W 48/18; H04W 76/10; H04W 8/005
See application file for complete search history.

(56) References Cited

U.S. PATENT DOCUMENTS

| | | | | |
|---|---|---|---|---|
| 11,102,696 | B1 * | 8/2021 | Chockalingam | H04M 15/66 |
| 2019/0313319 | A1 * | 10/2019 | Qiao | H04M 15/63 |
| 2021/0368341 | A1 * | 11/2021 | Liao | H04W 12/72 |
| 2022/0247869 | A1 * | 8/2022 | Johnson | H04M 15/60 |
| 2023/0199612 | A1 * | 6/2023 | Butler | H04W 4/029 455/418 |
| 2023/0269250 | A1 * | 8/2023 | Canpolat | H04L 9/006 726/6 |
| 2025/0350949 | A1 * | 11/2025 | Baskaran | H04L 63/1408 |

FOREIGN PATENT DOCUMENTS

EP 4247035 A1 * 9/2023 .......... H04W 12/082

OTHER PUBLICATIONS

Translation, EP 4247035. (Year: 2023).*

* cited by examiner

*Primary Examiner* — Christopher Biagini
(74) *Attorney, Agent, or Firm* — Shook Hardy & Bacon L.L.P.

(57) ABSTRACT

Systems and methods are contemplated herein for determining whether to restrict an IoT device from one or more IoT networks. The method may include receiving, at an interface module, an indication to initiate a logic flow. The method may include retrieving, by the interface module during the logic flow, IoT device information associated with the IoT device. The method may include determining, based on the IoT device information associated with the IoT device, whether to exclude the IoT device from restriction or restrict the IoT device from accessing the one or more IoT networks.

20 Claims, 4 Drawing Sheets

UTILIZING IoT DEVICE INFORMATION TO DYNAMICALLY DETERMINE WHETHER TO RESTRICT AN IOT DEVICE FROM ACCESSING ONE OR MORE IOT NETWORKS

SUMMARY

The present disclosure is directed, in part to determining whether to restrict IoT devices from one or more IoT networks, substantially as shown and/or described in connection with at least one of the figures, and as set forth more completely in the claims.

According to various aspects of the technology, users and entities (e.g., enterprises, governments, nonprofits) often employ internet of things (IoT) devices (e.g., smart home devices, tracking devices) to monitor, remotely manage, automate, and/or communicate data across various systems. IoT devices may be vulnerable to security breaches, as IoT devices are often associated with weaker security configurations. Systems and methods of restricting IoT devices based on a variety of IoT device information are provided. A network may incorporate an interface module to selectively restrict particular IoT devices from accessing one or more IoT networks. The interface module may retrieve IoT device information and perform a logic flow using at least some of the IoT device information. The interface module may determine, after considering at least some of the IoT device information, to restrict the IoT device from the one or more IoT networks. The interface module may effectuate the restriction by modifying an IoT access restriction indicator from one or more profiles associated with the IoT device to indicate the IoT device can or cannot access the one or more IoT networks.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

DETAILED DESCRIPTION

Figure 1:
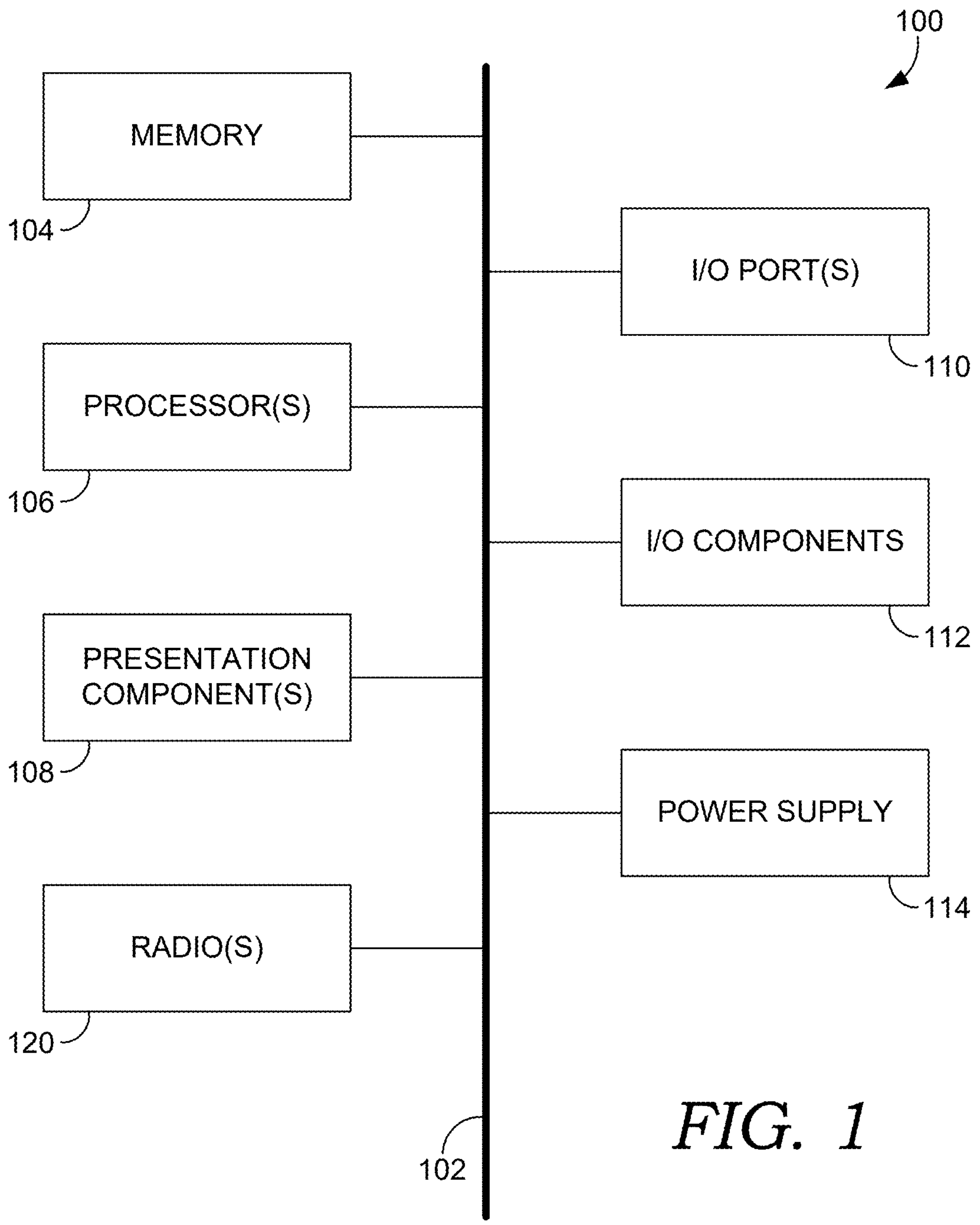
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, users and entities (e.g., enterprises, governments, nonprofits) often employ internet of things (IoT) devices (e.g., smart home devices, tracking devices) to monitor, remotely manage, automate, and/or communicate data across various systems. For example, a smart thermostat may be considered an IoT device, as it communicates with a network to provide and update data such that a user associated with the IoT device may view the data on a smartphone application. IoT devices may be vulnerable to security breaches, as IoT devices are often associated with weaker security configurations. For example, an unauthorized actor may attempt to activate an IoT device in an IoT network (e.g., a narrowband IoT (NB-IoT) network) and may utilize network resources such that the IoT network is congested or is entirely inaccessible to authorized IoT devices. Methods enabling the restriction of unauthorized IoT devices are therefore desirable.

Conventionally, MNOs may restrict IoT devices from accessing an IoT network based on single variables. For example, an MNO may elect to restrict an IoT device based on a device identifier (e.g., an international mobile equipment identity (IMEI)). Further, present systems and methods to selectively restrict an IoT device lack flexibility. For example, a restricted IoT device may undergo a change such that the IoT device is authorized to access an IoT network. In this example, the IoT device may be associated with an IoT access restriction indicator added prior to the change such that once the device is authorized to access the IoT network, IoT access restriction indicator prevents the authorized use of the IoT network. Present systems and methods are insufficient to make robust restriction determinations and provide flexibility in selectively restricting IoT devices from IoT networks.

In contrast to conventional solutions and to provide a flexible and robust approach to restrict IoT devices from one or more IoT networks, the present disclosure is directed to systems and methods for restricting IoT devices based on IoT device information. A network may incorporate an interface module to selectively restrict particular IoT devices from accessing one or more IoT networks. The interface module may retrieve IoT device information, such as device identifier information (e.g., an international mobile equipment identity (IMEI)), service information (e.g., service entitlements associated with the IoT device), onboarding information (e.g., whether the IoT device is onboarded with a host network) and/or access restriction information (e.g., an IoT access restriction indicator). The interface module may perform a logic flow using at least some of the IoT device information. The interface module may determine, after considering at least some of the IoT device information, to restrict the IoT device from accessing the one or more IoT networks or exclude the IoT device from restriction. The interface module may effectuate the restriction by modifying (e.g., creating, removing, modifying the value of, a combination of these) an IoT access restriction indicator from one or more profiles associated with the IoT device to indicate the IoT device can or cannot access the one or more IoT networks. This solution provides a more robust and flexible approach to restricting IoT devices from accessing one or more IoT network.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment (UE), wireless communication device, or user device. The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, one or more input/output (I/O) ports 110, one or more I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of the one or more I/O components 112. Also, processors, such as the one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as “workstation,” “server,” “laptop,” “handheld device,” etc., as all are contemplated within the scope of FIG. 1 and refer to “computer” or “computing device.”

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as the bus 102, the memory 104 or the one or more I/O components 112. The one or more presentation components 108 presents data indications to a person or other device. Exemplary one or more presentation components 108 include a display device, speaker, printing component, vibrating component, etc. The one or more I/O ports 110 allow computing device 100 to be logically coupled to other devices including the one or more I/O components 112, some of which may be built in computing device 100. Illustrative I/O components 112 include a microphone, joystick, game pad, satellite dish, scanner, printer, wireless device, etc.

The radio 120 represents one or more radios that facilitate communication with one or more wireless networks using one or more wireless links. While a single radio 120 is shown in FIG. 1, it is expressly contemplated that there may be more than one radio 120 coupled to the bus 102. In aspects, the radio 120 utilizes a transmitted to communicate with a wireless telecommunications network. It is expressly contemplated that a computing device 100 with more than one radio 120 could facilitate communication with the wireless network via both the first transmitter and additional transmitters (e.g. a second transmitter). Illustrative wireless telecommunications technologies include CDMA, GPRS, TDMA, GSM, and the like. The radio 120 may carry wireless communication functions or operations using any number of desirable wireless communication protocols, including 802.11 (Wi-Fi), WiMAX, LTE, 3G, 4G, LTE, 5G, NR, VoLTE, or other VoIP communications. As can be appreciated, in various embodiments, the radio 120 can be configured to support multiple technologies and/or multiple radios can be utilized to support multiple technologies. A wireless telecommunications network might include an array of devices, which are not shown as to obscure more relevant aspects of the invention. Components such as a base station or communications tower (as well as other components) can provide wireless connectivity in some embodiments.

Figure 2:
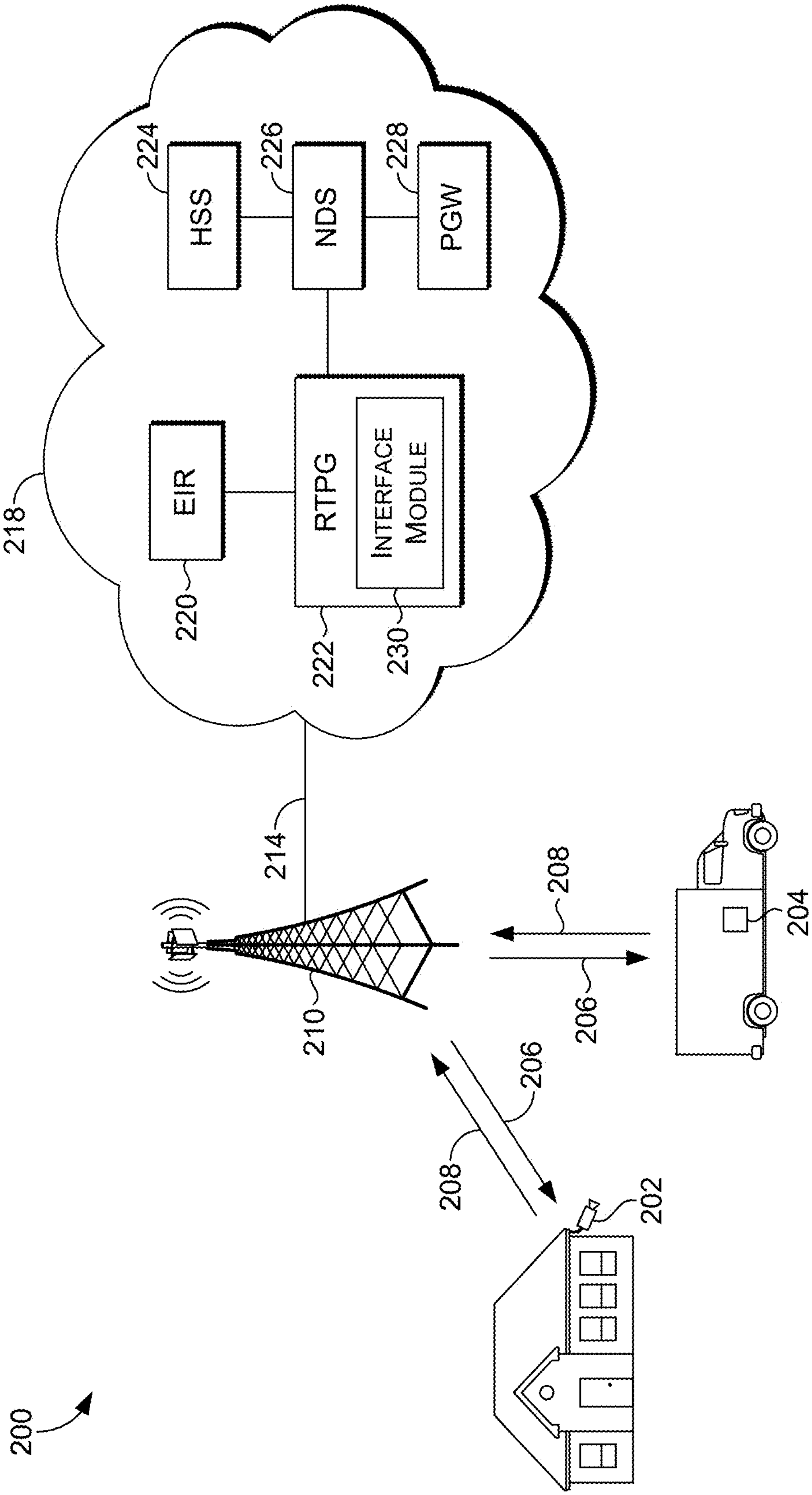
FIG. 2 illustrates a diagram of an exemplary network environment in which implementations of the present disclosure may be employed.

Referring now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment 200 be interpreted as having any dependency or requirement relating to any one or combination of components illustrated.

Network environment 200 represents a high level and simplified view of relevant portions of one or more modern wireless telecommunication networks. At a high level, the network environment 200 may generally be said to comprise one or more IoT devices, such as a first IoT device 202 and/or a second IoT device 204, one or more base stations, such as a base station 210, and a core network 218, though in some implementations, it may not be necessary for certain features to be present. Similarly, while each component is shown in the singular, it is expressly contemplated that there may be more than one of the components described. The network environment may include a number of routers, switches, and the like. The network environment 200 is generally configured for wirelessly connecting the first IoT device 202 and/or the second IoT device 204 to data or services that may be accessible on one or more application servers or other functions, nodes, or servers not pictured in FIG. 2 so as to not obscure the focus on the present disclosure.

The network environment 200 comprises the first IoT device 202 and/or the second IoT device 204. The first IoT device 202 is illustrated as a surveillance camera affixed to an exterior of a residential home, and the second IoT device 204 is illustrated as a carrier tracking sensor affixed to and/or within a commercial vehicle. While illustrated as specific examples, the first IoT device 202 and/or the second IoT device 204 and may take any number of forms, including any device discussed with respect to FIG. 1 and may have any one or more components or features of the computing device 100 of FIG. 1. The first IoT device 202 and/or the second IoT device 204 may take the form of smart appliances (e.g., smart thermostat, smart refrigerator, smart food scale, smart lawn mower), smart sensors (traffic sensors, air quality sensors, soil moisture sensors, temperature sensors), or other smart devices (e.g., fitness tracker, light fixtures, door locks, doorbells), for example. The first IoT device 202 and/or the second IoT device 204 may communicate with one or more networks to provide and/or update information, present live information, or a combination of these to one or more application servers. For example, the first IoT device 202 may connect to the core network 218 to communicate live video footage of the residential home to an application server such that a resident of the home may access an application and view the live video footage.

The network environment 200 comprises one or more base stations, such as the base station 210, to which the first IoT device 202 and/or the second IoT device 204 may potentially connect to (also referred to as 'camping on,' 'attaching,' in the industry). Though network environment 200 is illustrated with one base station 210, one skilled in the art will appreciate that more or fewer base stations may be present in any particular network environment. The base station 210 of the network environment 200 is configured to wirelessly communicate with various devices, such as the first IoT device 202 and/or the second IoT device 204. In aspects, the base station 210 may communicate with the first IoT device 202 and/or the second IoT device 204 using any wireless telecommunication protocol desired by a network operator, including but not limited to 2G, 3G, 4G, 5G, 6G, 802.11x, LoRa, LoRaWAN, and the like. The base station 210 may communicate signals to one or more devices (e.g., the first IoT device 202 and/or the second IoT device 204) via a downlink 206 and receive signals from one or more devices via uplink 208. In response to receiving certain requests from the first IoT device 202 and/or the second IoT device 204, for example, the base station 210 may communicate with the core network 218 via a backhaul 214. For example, in order for the first IoT device 202 and/or the second IoT device 204 to connect to a desired application server, the first IoT device 202 and/or the second IoT device 204 may communicate an attach request to the base station 210, which may, in response, communicate a registration request to the core network 218 via the backhaul 214.

The core network 218 may comprise one or more network functions (NFs). As used herein, the term "network function" is used to describe a computer processing module and/or one or more computer executable services being executed on one or more computing processing modules. NFs within the core network 218 are defined by their function, as the core network 218 is a service-based architecture. The core network 218 may comprise NFs that include any one or more of an equipment identity register (EIR) 220, a real-time provisioning gateway (RTPG) 222, a home subscriber server (HSS) 224, a network directory server (NDS) 226, and a provisioning gateway (PGW) 228. Each of these NFs may communicate with each other, directly or indirectly, via interfaces existing between them. Each of the preceding NFs may take different forms, including consolidated or distributed forms that perform the same general operations. In other architectures or protocols, the NFs may be given other names, however, the NFs herein refer to functions, not specifically identified components. For example, the EIR 220 may instead be a different device management platform.

Though the EIR 220, the RTPG 222, the HSS 224, the NDS 226, and the PGW 228 are illustrated in the core network 218, the core network 218 may have more or fewer NFs than shown. For example, the core network 218 may include a serving gateway (SGW), a mobility management entity (MME), and/or a non-IP data delivery (NIDD) server (e.g., such as to enable first IoT device 202 and/or the second IoT device 204 to connect to an NB-IoT network). Further, though the EIR 220, the RTPG 222, the HSS 224, the NDS 226, and the PGW 228 are illustrated as disposed within the core network 218, it is expressly contemplated that the location in the network environment 200 is non-limiting. For example, the NFs described above may be disposed between the base station 210 and the core network 218 (i.e., the network edge) or may be isolated as stand-alone components, or a combination of these. While each of the NFs described above are illustrated in the singular, it is expressly contemplated that the network environment 200 may include one or more of each of the NFs described above.

The EIR 220, for example, is generally responsible for managing device information (e.g., international mobile equipment identities (IMEIs)) which allows the network to allow, monitor, and/or block devices attempting to access the network. In aspects, the EIR 220 may communicate with the NDS 226, such as to update user and/or device information stored at the NDS 226 (e.g., the EIR 220 communicates the first IoT device 202 is blocked from accessing the network, and the NDS 226 stores this determination in one or more of its profiles).

The RTPG 222, for example, is generally responsible for facilitating the activation, deactivation, and management of services for users of the network, ensuring that service changes are processed and applied in real-time. The RTPG 222 may comprise an interface module 230. The interface module 230 is generally responsible for determining whether to restrict IoT devices or excluding IoT devices from restriction based on at least some IoT device information. In some aspects, the interface module 230 may be configured to present IoT devices (e.g., the first IoT device 202 and/or the second IoT device 204) to a user and/or entity associated with them by serving as and/or communicating with an IoT device management program. For example, the second IoT device 204 may be one of many IoT devices associated with a shipping company. The shipping company may view and manage the IoT devices of their fleets by accessing the interface module 230 and/or accessing a device management program in communication with the interface module 230. In aspects, the interface module 230 may communicate with an application server associated with the IoT devices.

The HSS 224, for example, is generally responsible for managing user data, such as user, subscriber, and/or device profiles, authentication credentials, and subscription details. The HSS 224 also functions in roaming contexts. For example, the HSS 224 may communicate with a visiting network to manage and update data within one or more profiles as a device moves between different networks. In one example, the second IoT device 204 on the commercial vehicle may move between the second IoT device's 204 home network (i.e., the network the second IoT device 204 uses when not roaming) and a visiting network, such as when the commercial vehicle crosses from the United States into Canada. The visiting network may communicate with the HSS 224 to provide updated information, such as device location information. In aspects, the device information is IoT device information, and the HSS 224 may communicate this IoT device information to the NDS 226 for storage in one or more profiles of the NDS 226.

The NDS 226, for example, is generally responsible for hosting and storing device, user, subscription, and/or network data, and may be configured to provide various information to NFs. The NDS 226 may store various profiles, such as one or more profiles associated with an IoT device (e.g., user, subscriber, and/or device profiles), which may include at least a portion of the IoT device information. The NDS 226 may store IoT device information such as device identifier information, service information, onboarding information, access restriction information, or a combination of these. In aspects, the NDS 226 includes one or more subscription databases (e.g., a user subscription database (USD)) or the NDS 226 communicates with one or more subscription databases.

The PGW 228, for example, is generally responsible for managing the configuration and activation of network services for users and devices (e.g., the first IoT device 202 and/or the second IoT devices 204). The PGW 228 may act as an intermediary between service providers and the network, ensuring resources are allocated, services are activated, and settings are applied. In aspects, the PGW 228 may be configured to identify and communicate designated provisioning changes associated with one or more devices, such as the first IoT device 202 and/or the second IoT device 204, to the NDS 226.

Relevant to the present disclosure, the interface module 230 may be configured to perform a logic flow. During the logic flow, the interface module 230 may retrieve IoT device information from one or more NFs (e.g., the RTPG 222, the interface module 230, and/or the NDS 226). Based on at least some of the IoT device information, the interface module 230 determines whether a particular IoT device (e.g., the first IoT device 202 and/or the second IoT device 204) is eligible for restriction from accessing one or more IoT networks or whether the IoT device is excluded from restriction. If the interface module 230 determines the IoT device is eligible for restriction from accessing the one or more IoT networks, the interface module 230 may modify (e.g., create, remove, and/or modify the value of) an IoT access restriction indicator of the IoT device to effectuate the restriction and prevent or enable the IoT device from accessing the one or more IoT networks.

Figure 3:
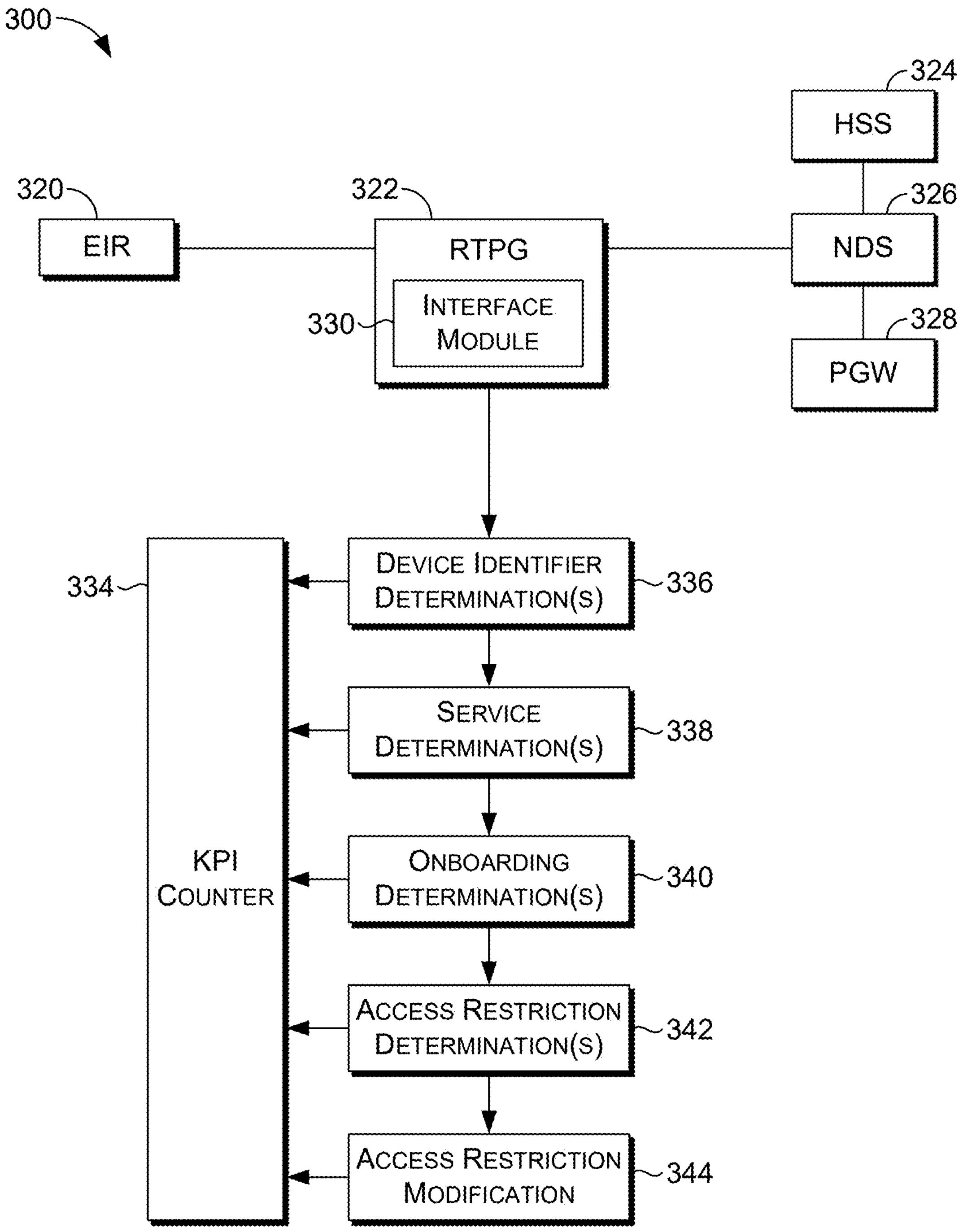
FIG. 3 illustrates a flow diagram of an exemplary logic flow for determining whether to exclude an IoT device from restriction from one or more IoT networks or to restrict the IoT device from accessing the one or more IoT networks in which implementations of the present disclosure may be employed.

Turning now to FIG. 3, a logic flow diagram is illustrated in accordance with one or more aspects of the present disclosure. A logic flow 300 may be performed by and/or facilitated by one or more NFs discussed in greater detail herein and is not meant to exhaustively show every interaction that would be necessary to practice the invention, so as not to obscure the present disclosure. The logic flow 300 may generally involve an EIR 320 (e.g., the EIR 220 of FIG. 2), an RTPG 322 (e.g., the RTPG 222 of FIG. 2), an HSS 324 (e.g., the HSS 224 of FIG. 2), an NDS 326 (e.g., the NDS 226 of FIG. 2), a PGW 328 (e.g., the PGW 228 of FIG. 2), and a key performance indicator (KPI) counter 334. The RTPG 322 may include an interface module 330 (e.g., the interface module 230 of FIG. 2). The logic flow 300 may include one or more aspects described with respect to FIG. 2. In aspects, the logic flow 300 is performed by the interface module 330 to determine whether to exclude an IoT device from restriction or restrict the IoT device from accessing one or more IoT networks. Each of the preceding NFs may take different forms, including consolidated or distributed forms that perform the same general operations. In other architectures or protocols, the NFs may be given other names, however, the NFs herein refer to functions, not specifically identified components.

The logic flow 300 includes the KPI counter 334, which is generally responsible for collecting, storing, organizing, and/or allocating KPIs associated with the logic flow 300. For example, if an IoT device is found to be excluded from restriction, the occurrence of this determination may be communicated to the KPI counter 334 by the interface module 330. Further, for example, if the IoT device is found to be eligible for restriction from accessing the one or more IoT networks, the occurrence of this determination may similarly be communicated to the KPI counter 334. In aspects, the KPI counter 334 is a subcomponent and/or a module of one of the EIR 320, the RTPG 322, or the NDS 326. In some aspects, the KPI counter 334 collects, stores, and organizes the determinations in the KPI counter 334, and in other aspects, the KPI counter 334 collects, organizes, and allocates the determinations to other network components or other NFs (e.g., a performance management system (PMS), a network management system (NMS)). The KPI counter 334 may additionally collect, store, organize, and/or allocate data associated with the determination, such as the information relevant to the determination (e.g., the device identifier information, the service information, the onboarding information, the access restriction information) and which information was dispositive in making the determination. The KPI counter 334 may collect metadata such as time of determination, network access type of the IoT device, and the like.

In aspects, the logic flow 300 may be initiated by the RTPG 322 and/or the interface module 330 receiving an indication to initiate the logic flow 300. The interface module 330 may be configured to initiate the logic flow 300 upon receipt of the indication. In some aspects, the indication is received by the RTPG 322 and/or the interface module 330 from one of the NDS 326 or the EIR 320. The EIR 320 may be configured to identify particular IoT device changes associated with the IoT device, and in response, notify the RTPG 322 and/or the interface module 330 of the IoT device changes (e.g., in the indication to initiate the logic flow 300). The NDS 326 may be configured to identify particular provisioning changes associated with the IoT device (e.g., provisioning changes received from the PGW 328), and in response, notify the RTPG 322 and/or the interface module 330 of the provisioning changes (e.g., in the indication to initiate the logic flow 300). In other aspects, the indication to initiate the logic flow 300 may be communicated by only the NDS 326. In such aspects, the EIR 320 may communicate with the NDS 326 and update one or more profiles of the NDS 326 (e.g., user, subscriber, and/or device profiles) to include one or more IoT device changes associated with the IoT device. In such aspects, the NDS 326 may be configured to identify specified provisioning and IoT device changes (e.g., which may be received from the EIR 320, the HSS 324 and/or the PGW 328) associated with the IoT device, and in response, notify the RTPG 322 and/or the interface module 330 of the provisioning changes and/or IoT device changes (e.g., in real-time), causing the logic flow 300 to initiate. In other aspects, the logic flow 300 is manually initiated, such as by an MNO.

Provisioning changes associated with the IoT device may take a number of possible forms. Provisioning changes generally include changes to service and/or subscription plans the IoT device is associated with, changes to the subscriber identity module (SIM) card, mobile station international subscriber directory number (MSISDN) changes, service activation, service deactivation, service reactivation, and the like. For example, a user or entity associated with the IoT device may elect to increase their QoS of the subscription plan associated with the IoT device, add additional services (e.g., purchase additional data resources), bundle various services and/or devices together, extend the duration of the subscription plan, and the like. The IoT device may change its MSISDN, be associated with a new subscription plan, be associated with a new subscriber identity module (SIM) card, and the like.

IoT device changes associated with the IoT device may take a number of possible forms. IoT device changes may include an IoT device's initial registration with the network (e.g., the EIR 320 receives an attach request from the IoT device), receiving a new or unrecognized device identifier (e.g., an international mobile equipment identity (IMEI)) (e.g., at the NDS 226, at the EIR 320), identifying a roaming IoT device, and the like. For example, the second IoT device 204 may be associated with an enterprise in Country 1 (e.g., a home network), and the commercial vehicle roams into Country 2 (e.g., a visiting network). In this example, the HSS 224 communicates with the visiting network of Country 2 to provide updated information about the second IoT device 204. The occurrence of this updated information (e.g., logging the updated location information in one or more profiles associated with the IoT device) may cause the indication to be communicated to the interface module 230.

Once the logic flow 300 is initiated, the interface module 330 may retrieve IoT device information associated with an IoT device (e.g., the first IoT device 202 and/or the second IoT device 204 of FIG. 2). IoT device information may include any one or more of device identifier information, service information, onboarding information, and access restriction information. In some aspects, the interface module 330 retrieves the IoT device information before making any determinations based on the IoT device information. In other aspects, the interface module 330 retrieves IoT device information sequentially. For example, the interface module 330 may first retrieve the device identifier information and make one or more device identifier determinations 336 prior to retrieving additional IoT device information. Advantageously, if an IoT device is excluded from restriction at an initial determination, it may be an inefficient use of network resources to preemptively retrieve additional IoT device information. In aspects, one or more NFs may assist the interface module 330 in accessing at least some of the IoT device information, such as an NF directing the interface module 330 to a particular database or a particular area of the NDS 326.

The interface module 330 may retrieve device identifier information associated with the IoT device and/or a user or an entity associated with the IoT device. Device identifier information may include any one or more of a MSISDN, an international mobile subscriber identity (IMSI), an IMEI, an IMEI software version (IMEISV), an IP address, globally unique permanent identifier (GUPI), subscription permanent identifier (SUPI), group subscriber identifiers (e.g., decentralized identifiers (DID)), subscriber and/or entity identifiers (e.g., which entity the IoT device is associated with), and the like. In some aspects, the interface module 330 retrieves the device identifier information from the indication causing the logic flow 300 to initiate. For example, the interface module 330 may receive a notification and/or communication (i.e., the indication) from the RTPG 322 and/or the NDS 326. In some aspects, at least some of the device identifier information is retrieved from the indication. In other aspects, the interface module 330 retrieves the device identifier information from the NDS 326, such as from one or more profiles stored at the NDS 326.

The interface module 330 may make one or more device identifier determinations 336 based on the device identifier information. In some aspects, the interface module 330 may use the device identifier information to retrieve one or more activity statuses from the NDS 326. In other aspects, the interface module 330 may retrieve the one or more activity statuses from another NF, such as the HSS 324, a unified data management (UDM) function, and the like. As used herein, one or more activity statuses include one or more subscription statuses (e.g., the IoT device is not associated an active subscription), billing statuses (e.g., a user or entity associated with the IoT device has not paid the bill), deactivation statuses (e.g., the IoT device has not used the one or more IoT networks for a specified duration), SIM card statuses (e.g., the IoT device's SIM card is deactivated), and the like. In such aspects, the interface module 330 may determine, based on the device identifier information that the IoT device, entity, and/or user associated with the device identifier information, is inactive. For example, the interface module 330 may retrieve the MSISDN associated with the IoT device and determine the IoT device associated with the MSISDN is inactive (e.g., based on the one or more activity statuses). When the IoT device is determined as inactive, the interface module 330 may determine the IoT device is excluded from restriction and logs the occurrence of the one or more device identifier determinations 336 at the KPI counter 334. When the IoT device is determined as active, the IoT device is determined as eligible for restriction, and the logic flow 300 continues.

The interface module 330 may retrieve service information associated with the IoT device. In aspects, the interface module 330 retrieves the service information from the NDS 326, such as from one or more profiles associated with the IoT device, and/or the interface module's 330 own storage. In aspects, the service information includes whether a service and/or subscription plan associated with the IoT device is an IoT plan (e.g., an NB-IoT plan, an LTE-M plan), such that the plan is suitable for IoT devices. In other aspects, the plan information includes whether a service and/or subscription plan is both an IoT plan and is associated with a correct IoT plan. A correct IoT plan includes a plan associated with a subscriber that corresponds to an entity (e.g., a user, entity, government) listed in the one or more profiles associated with the IoT device and/or a plan that corresponds to a particular use case associated with the IoT device. In aspects, the service information may include whether the plan is associated with low data and/or low power. The service information may include service entitlements associated with the plan of the IoT device (e.g., data quotas, data pooling, guaranteed uptime, latency guarantees, roaming capabilities, multi-carrier connectivity, remote IoT device management capabilities, virtual private network (VPN) access capabilities). The service information may include a particular use case the IoT device is associated with (e.g., vehicle fleet tracking) and/or a particular subscriber (e.g., an entity) the IoT device is associated with. The service information may include whether the particular use case and/or the particular subscriber the IoT device is associated with is eligible for restriction or is excluded from restriction.

The interface module 330 may make one or more service determinations 338 based on the service information. In aspects, the interface module 330 determines the IoT device is or is not associated with an IoT plan and/or a correct IoT plan. In some of such aspects, aspects, the interface module 330 determines the IoT device is associated with an IoT plan and/or a correct IoT plan, determines the IoT device is excluded from restriction, and logs the service determination 338 in the KPI counter 334. In others of such aspects, the interface module 330 determines the IoT device is not associated with an IoT and/or a correct IoT plan, determines the IoT device is eligible for restriction, and the logic flow 300 continues. In aspects, the interface module 330 determines the particular use case and/or the particular subscriber associated with the IoT device is eligible for restriction or excluded from restriction. In some of such aspects, the interface module 330 determines the particular use case and/or subscriber associated with the IoT device is excluded from restriction and the occurrence of this service determination 338 is logged in the KPI counter 334. In others of such aspects, the interface module 330 may determine the particular use case and/or the particular subscriber associated with the IoT device is eligible for restriction and the logic flow 300 continues.

The interface module 330 may retrieve onboarding information associated with the IoT device. In aspects, the interface module 330 may retrieve the onboarding information from its own stored information or from the NDS 326. Onboarding information may include whether the IoT device is onboarded with a host network. A host network may host one or more IoT networks (e.g., an NB-IoT network) within its own network, and a particular IoT device may be onboarded with the host network prior to using the one or more IoT networks. The onboarding information may be associated with a level of trust with the IoT device. For example, IoT devices onboarded with the host network may be less likely to pose a security risk, while IoT devices that have not onboarded with the host network may pose a security risk. In aspects, the onboarding information may include additional information such as when the IoT device was onboarded with the host network, when the one or more profiles associated with the IoT device were created, and the like.

The interface module 330 may make one or more onboarding determinations 340 based on the onboarding information. In some aspects, the interface module 330 first determines whether the onboarding information is available. In such aspects, if the onboarding information is unavailable, the occurrence of this determination is logged in the KPI counter 334. In such aspects, if the interface module 330 determines the onboarding information is available, the interface module 330 may make one or more additional onboarding determinations 340. The one or more onboarding determinations 340 may include the interface module 330 determining the IoT device is onboarded with the host network or is not onboarded with the host network. In aspects where the IoT device is not onboarded with the host network, the IoT device is determined as eligible for restriction and the logic flow 300 continues. In aspects where the IoT device is onboarded with the host network, the IoT device is determined as excluded from restriction, and the logic flow 300 continues.

The interface module 330 may retrieve access restriction information associated with the IoT device. Access restriction information may include an IoT access restriction indicator. In some aspects, the IoT access restriction indicator may be present or absent from the one or more profiles associated with the IoT device to indicate whether the IoT device is eligible for restriction or excluded from restriction. In other aspects, the IoT access restriction indicator may have a first value when the IoT device is eligible for restriction and a second value when the IoT device is excluded from restriction. The one or more profiles associated with the IoT device and stored within the NDS 326 may include the IoT access restriction indicator and/or be modified to include the IoT access restriction indicator. One or more NFs (e.g., the interface module 330, the RTPG 322, the NDS 326) may modify the IoT access restriction indicator associated with the IoT device. For example, the one or more NFs may add an IoT access restriction indicator, may remove an IoT access restriction indicator, and/or may change the value of the IoT access restriction indicator. The presence and/or value of the IoT access restriction indicator may determine whether the restriction indicator should indicate the IoT device is eligible for restriction or excluded from restriction. The IoT access restriction indicator may be added ad hoc, added during the logic flow 300, and/or a combination thereof.

The interface module 330 may make one or more access restriction determinations 342 based on the onboarding information and the access restriction information. In aspects where the IoT device is onboarded (and is excluded from restriction), the interface module 330 may determine the presence and/or value of the IoT access restriction indicator is improper (i.e., the IoT access restriction indicator does not correspond with the determination to exclude the IoT device from restriction) and the logic flow 300 continues. In such aspects where the IoT device is onboarded (and is excluded from restriction), the interface module 330 may determine the lack and/or value of the IoT access restriction indicator is proper and log this determination in the KPI counter 334. In aspects where the IoT device is not onboarded (and is eligible for restriction), the interface module 330 may determine the presence and/or value of the IoT access restriction indicator is proper and log the occurrence of this determination in the KPI counter 334. In aspects where the IoT device is not onboarded (and is eligible for restriction), the interface module 330 may determine the lack of the IoT access restriction indicator is improper (i.e., the IoT access restriction indicator does not correspond with the determination of the IoT device being eligible for restriction) and the logic flow 300 continues.

The interface module 330 may make an access restriction modification 344. In aspects, modification includes both creating an IoT access restriction indicator, removing an IoT access restriction indicator, and/or modifying the value of an IoT access restriction indicator. In aspects where the IoT device is onboarded (and is excluded from restriction), the interface module 330 may determine the presence of the IoT access restriction indicator is improper and remove the IoT access restriction indicator (or modify the value of the IoT access restriction indicator to a value indicating the IoT device is excluded from restriction). In aspects where the IoT device is not onboarded (and is eligible for restriction), the interface module 330 may determine the lack of the IoT access restriction indicator is improper and create an IoT access restriction indicator in one or more profiles associated with the IoT device (or modify the value of the IoT access restriction indicator to a value indicating the IoT device is restricted). In aspects, when one or more profiles associated with the IoT device contains the IoT access restriction indicator (or contains an IoT access restriction indicator having a value indicating the IoT device is restricted), the IoT device is unable to access the one or more IoT networks (e.g., NB-IoT network). In some aspects, the access restriction modification 344 is logged at the KPI counter 334 and/or is stored in one or more profiles associated with the IoT device at the NDS 326.

While the above determinations described with respect to FIG. 3 are described in a specific sequence, the one or more determinations may be completed in a different order than described. As one illustrative example, the interface module 330 may make the one or more service determinations 338 prior to the one or more device identifier determinations 336. The criteria and/or considerations evaluated by the interface module 330 to make the one or more determinations may be altered, such as by the MNO that owns and operates the host network.

Figure 4:
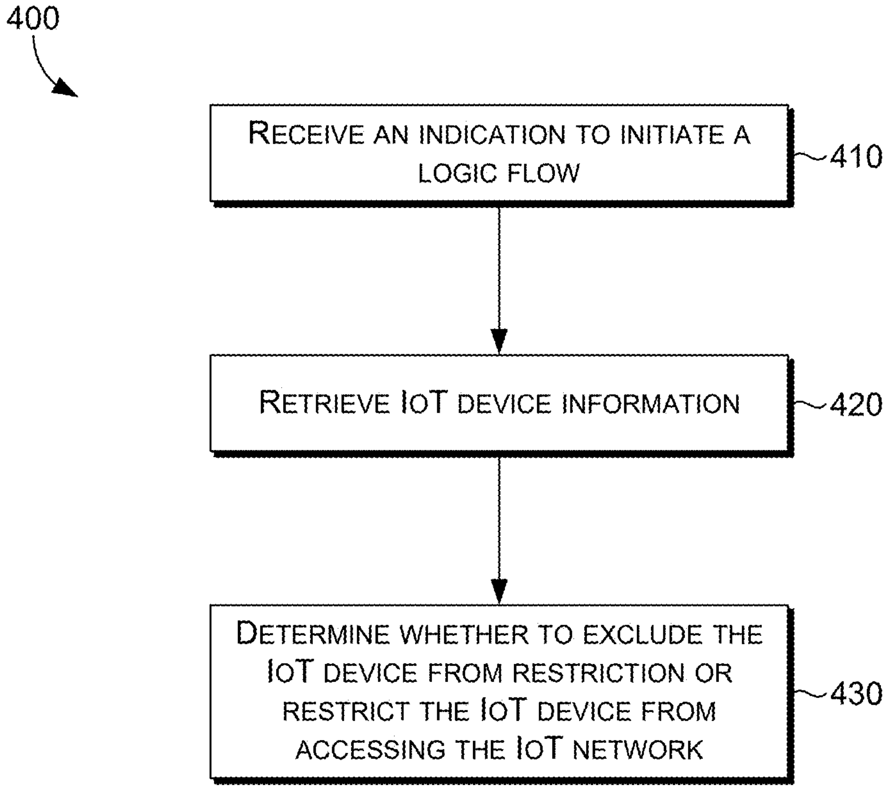
FIG. 4 illustrates a flow diagram of an exemplary method for determining whether to exclude an IoT device from restriction from one or more IoT networks or to restrict the IoT device from accessing the one or more IoT networks in which implementations of the present disclosure may be employed.

Turning now to FIG. 4, a flow chart is provided that illustrates one or more aspects of the present disclosure relating to a method 400 determining whether to restrict an IoT device from accessing one or more IoT networks. The method 400 may include one or more aspects described with respect to FIGS. 2-3.

At a first step 410, an interface module (e.g., the interface module 230 of FIG. 2, the interface module 330 of FIG. 3) receives an indication to initiate the logic flow (e.g., the logic flow 300 of FIG. 3). In aspects, the indication is based on one or more of a device change and/or a provisioning change associated with the IoT device, as described with respect to FIG. 3. At a second step 420, the interface module retrieves IoT device information associated with the IoT device. In aspects, the interface module retrieves the IoT device information during the logic flow. The IoT device information may include any one or more of device identifier information, service information, onboarding information, and/or access restriction information associated with the IoT device, as described with respect to FIG. 3. In aspects, during the logic flow, the interface module may make one or more determinations (e.g., the one or more device identifier determinations 336, the one or more service determinations 338, the one or more onboarding determinations 340, and/or the one or more access restriction determinations 342 of FIG. 3), as described with respect to FIG. 3.

At a third step 430, the interface module determines whether to exclude the IoT device from restriction or determines to restrict the IoT device from accessing the one or more network technologies. The interface module may determine the IoT device is excluded from restriction and may remove and/or modify an IoT access restriction indicator associated with the IoT device and/or log the relevant determination with the KPI counter (e.g., the KPI counter 334 of FIG. 3), as described with respect to FIG. 3. The interface module may determine the IoT device is eligible for restriction and/or determines to restrict the IoT device from accessing the one or more IoT networks. In such aspects, the interface module may add and/or modify an IoT access restriction indicator associated with the IoT device and/or log the relevant determination with the KPI counter, as described with respect to FIG. 3.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for determining whether to restrict an internet of things (IoT) device from accessing one or more IoT networks, the method comprising:

receiving, at an interface module, an indication to initiate a logic flow based on a change associated with an IoT device;

retrieving, by the interface module during the logic flow, IoT device information from one or more profiles associated with the IoT device, wherein the IoT device information reflects the change;

based on the IoT device information, determining the IoT device is (i) eligible for restriction from accessing one or more IoT networks or (ii) is excluded from restriction;

based on the determination, and based on an IoT access restriction indicator not corresponding to an outcome of the determination, modifying the IoT access restriction indicator for storage at the one or more profiles associated with the IoT device, wherein the modified IoT access restriction indicator properly indicates the IoT device is (i) eligible for restriction from accessing the one or more IoT networks or (ii) is excluded from restriction, following the change associated with the IoT device; and based on modifying the IoT access restriction indicator, causing a network function (NF) to (i) allow or (ii) block the IoT device from accessing the one or more IoT networks based on the modified IoT access restriction indicator stored at the one or more profiles associated with the IoT device.

2. The method of claim 1, wherein the IoT device information includes device identifier information, service information, onboarding information, and access restriction information.

3. The method of claim 1, wherein the IoT access restriction indicator is modified by removing the IoT access restriction indicator from the one or more profiles based on the IoT device information indicating the IoT device is onboarded with a host network.

4. The method of claim 1, wherein the IoT access restriction indicator is modified by creating the modified IoT access restriction indicator based on each of the IoT device information indicating the IoT device is not onboarded with a host network and the IoT device information indicating a lack of the IoT access restriction indicator is improper.

5. The method of claim 4, wherein creating the modified IoT access restriction indicator is further based on service information indicating the IoT device is not associated with an IoT plan.

6. The method of claim 5, wherein creating the modified IoT access restriction indicator is further based on device identifier information, wherein the device identifier information includes an international mobile equipment identity software version (IMEISV).

7. The method of claim 1, wherein the change is one of a device change or a provisioning change associated with the IoT device.

8. The method of claim 7, wherein the change is the device change, and wherein the device change comprises the IoT device entering a visiting network.

9. A method for determining whether to restrict an internet of things (IoT) device from accessing one or more IoT networks, the method comprising:

receiving, at an interface module, an indication to initiate a logic flow based on a change associated with an IoT device;

retrieving, by the interface module during the logic flow, IoT device information, wherein the IoT device information reflects the change;

based on the IoT device information, determining the IoT device is excluded from restriction from accessing one or more IoT networks;

based on misalignment between an IoT access restriction indicator and the determination that the IoT device is excluded from restriction, modifying the IoT access restriction indicator for storage at one or more profiles associated with the IoT device, wherein the modified IoT access restriction indicator properly indicates the IoT device is excluded from restriction;

logging the determination that the IoT device is excluded from restriction in a key performance indicator (KPI) counter; and based on modifying the IoT access restriction indicator, causing a network function (NF) to allow the IoT device to access the one or more IoT networks based on the modified IoT access restriction indicator stored at the one or more profiles associated with the IoT device.

10. The method of claim 9, wherein the IoT device information includes device identifier information, service information, onboarding information, and access restriction information.

11. The method of claim 10, wherein the change is one of a device change or a provisioning change associated with the IoT device.

12. The method of claim 11, wherein determining the IoT device is excluded from restriction is based on the device identifier information indicating the IoT device is not associated with an active subscription.

13. The method of claim 11, wherein determining the IoT device is excluded from restriction is based on the service information indicating the IoT device is not associated with an IoT plan.

14. The method of claim 11, wherein determining the IoT device is excluded from restriction is based on the IoT device being previously onboarded with a host network hosting the one or more IoT networks.

15. A method for determining whether to restrict an internet of things (IoT) device from accessing one or more IoT networks, the method comprising:

receiving, at an interface module, an indication to initiate a logic flow based on a change associated with an IoT device;

retrieving, by the interface module during the logic flow, IoT device information;

based on the IoT device information, determining (i) to exclude the IoT device from restriction or (ii) to restrict the IoT device from accessing one or more IoT networks;

based on an IoT access restriction indicator associated with the IoT device lacking alignment with an outcome of the determination, modifying the IoT access restriction indicator for storage at one or more profiles associated with the IoT device; and based on modifying the IoT access restriction indicator, causing a network function (NF) to (i) allow or (ii) block the IoT device from accessing the one or more IoT networks based on the modified IoT access restriction indicator stored at the one or more profiles associated with the IoT device.

16. The method of claim 15, further comprising:

determining to exclude the IoT device from restriction based on determining one or more of:

the IoT device is not associated with an active subscription, the IoT device is not associated with an IoT plan, the IoT device is not associated with a correct IoT plan, the interface module is unable to retrieve onboarding information, the IoT device is onboarded with a host network, and logging the determination to exclude the IoT device from restriction in a key performance indicator (KPI) counter.

17. The method of claim 16, wherein modifying the IoT access restriction indicator comprises modifying a value of the IoT access restriction indicator.

18. The method of claim 16, wherein modifying the IoT access restriction indicator comprises removing the IoT access restriction indicator from one or more profiles associated with the IoT device.

19. The method of claim 15, further comprising determining to restrict the IoT device from accessing the one or more IoT networks based on the interface module determining the IoT device is not onboarded with a host network hosting the one or more IoT networks.

20. The method of claim 15, further comprising determining to restrict the IoT device from accessing the one or more IoT networks, wherein modifying the IoT access restriction indicator comprises creating the modified IoT access restriction indicator indicating the IoT device is restricted from accessing the one or more IoT networks, and wherein the modified IoT access restriction indicator is stored in one or more profiles associated with the IoT device.

* * * * *